Patented Aug. 19, 1947

2,426,056

UNITED STATES PATENT OFFICE 2,426,056

CYANOACETIC ACID ESTERS OF POLYHYDRIC ALCOHOLS AND PROCESS OF MAKING SAME

John B. Rust, Montclair, N. J., assignor to Montclair Research Corporation, a corporation of New Jersey No Drawing. Application July 16, 1945, Serial No. 605,454

8 Claims. (Cl. 260—464)

1

This invention relates to polyhydric alcohol-cyanoacetic acid esters and the process of making them. An object is to prepare cyanoacetic esters which may be used as solvents and plasticizers for cellulose esters and ethers and for certain other resins, or which may be reacted with aldehydes to form synthetic resins. Another object is to provide compounds which are useful as insecticides and insect repellents. The esters behave as pseudo acids and are liquids or crystalline solids depending upon the polyhydric used and the extent to which it is esterified. Other objects will be apparent from the detailed description which follows:

Polyhydric alcohols which are esterified with cyanoacetic acid include those that are reactive with the acid and comprise the glycols (e. g., ethylene glycol, diethylene glycol, propylene glycol, ethylhexane-diol, methyl-pentane-diol and the like); glycerol and polyglycerol; mannitol and sorbitol; pentaerythritol and polypentaerythritols, erythritol and the like. Cellulose and starch are other polyhydric alcohols which can be esterified with cyanoacetic acid under suitable conditions.

The esters of this invention are comprised by the formula $(NC-CH_2-COO)_x-R(OH)_{n-x}$, where R represents the hydrocarbon residue of a polyhydric alcohol such as above named, $n$ is the number of hydroxyl groups in the polyhydric alcohol $R(OH)_n$, and $x$ is a number from 1 to $n$. The compounds include a polyhydric alcohol whose hydroxyl groups are partially or completely replaced by cyanoacetoxy groups. Some of the products are liquids and others are solids. They vary in solubility, those esters of the simpler polyhydric alcohols which contain free hydroxyl groups being soluble in alcohol or even in water, and those containing no free hydroxyl groups being insoluble in water and alcohol but soluble in acetone and the like.

The esters are preferably prepared by heating cyanoacetic acid or cyanoacetic esters of the lower alcohols with a polyhydric alcohol in the presence of a strong esterification catalyst and also in the presence of a volatile hydrocarbon which serves to remove water or the lower alcohol from the esterifying mixture by azeotropic distillation. After water or alcohol is substantially eliminated, the hydrocarbon is removed and the ester freed from unreacted material and acid catalyst.

As esterifying acid catalyst there may be used any strong acid such as hydrochloric, sulfuric, benzenesulfonic acid, etc. Hyrocarbons to use as esterifying media include preferably benzene

2 or toluene. Xylene may be used when a higher temperature is required, as in the alcoholysis of esters such as butyl cyanoacetate.

The following are illustrative examples of the products of this invention and how they are made. Various changes in operations and proportions are possible so that these examples are not to be considered as limiting.

Example 1.—A mixture of 37.2 g. ethylene glycol, 198 g. cyanoacetic acid, 8 g. toluenesulfonic acid and 200 cc. benzene was heated in a flask under a reflux condenser. A water trap between the flask and the condenser permitted water to be collected and benzene to be returned to the reaction. Heating was continued for 23 hours, during which time 21.4 cc. of water was obtained (calculated for complete replacement 21.6 cc.). The proportions are 4 moles acid per mole of glycol. The product was obtained by distilling off the benzene, neutralizing the acid catalyst with sodium bicarbonate solution and extracting the ester with ethyl acetate. On evaporating the solvent a light yellow oil was obtained, insoluble in water. Nitrogen 13.74% (calculated for di-ester 14.28%). Specific gravity 1.258 at 26° C. Index of refraction 1.459 (D, 26° C.). This ester is compatible with cellulose acetate and cellulose nitrate.

Example 2.—This example uses 2 moles ethylene glycol per mole of cyanoacetic acid in order to obtain a hydroxyl-containing glycol ester. 162 g. ethylene glycol and 114 g. cyanoacetic acid were heated as in Example 1 in the presence of 12.5 g. toluene-sulfonic acid and 250 cc. benzene. Heating was continued for 28.5 hours, collecting 36.4 cc. water. The ester was isolated by neutralizing the catalyst with aqueous sodium bicarbonate, saturating the solution with sodium chloride and extracting the ester with ethyl acetate. The ethyl acetate solution was dried with anhydrous sodium sulfate and distilled to leave a pale yellow liquid, soluble in water and in alcohol. A 4% solution of the ester in isopropyl alcohol was very effective as a mosquito repelling lotion.

Example 3.—46 g. glycerol and 283 g. cyanoacetic acid (.5 mole polyhydric alcohol per 3 moles acid) were heated with 200 cc. benzene and 16.5 g. toluenesulfonic acid as in Example 1 for 28 hours, during which time 19.9 cc. water was collected. The ester was isolated in the same manner as the product of Example 1 and was a thick, amber-colored oil, insoluble in water and in alcohol, soluble in acetone. Compatible with cellulose acetate. Nitrogen 11.9%. Specific gravity 1.298 at 26° C. $n_D^{26}$ 1.473.

*Example 4.*—Proportions of 1 mole cyanoacetic acid per 2 moles glycerol in order to obtain a hydroxyl-containing ester. 94 g. cyanoacetic acid (commercial grade of 90% purity), 184 g. glycerol, 13.9 g. toluenesulfonic acid and 200 cc. benzene heated for 28 hours, collecting 18 cc. water. The product was isolated as in Example 2. Light brown oil, soluble in water, alcohol and acetone.

*Example 5.*—36 g. mannitol, 208 g. cyanoacetic acid (proportion of 1 mole polyhydric alcohol to 11 moles of acid), 12 g. toluenesulfonic acid and 140 cc. benzene were heated 54 hours in the apparatus described under Example 1. The benzene was then poured off from the lower layer and the latter treated with sodium bicarbonate solution. Ethyl acetate was used to extract the ester from the reaction mixture. The product was a light brown liquid. Nitrogen 8.76%. Specific gravity 1.25 at 27° C. $n_D^{24}$ 1.466.

*Example 6.*—A mixture of 54.4 g. pentaerythritol (a commercial grade known as Pentek containing about 85% pentaerythritol and 15% dipentaerythritol), 303 g. cyanoacetic acid, 14 g. toluenesulfonic acid and 200 cc. benzene was heated for 29 hours under reflux with a trap beneath the condenser to catch the water given off. 28.8 cc. water was collected. The benzene layer was then poured off and the lower layer neutralized. A precipitate (100 g.) formed which was filtered off and dried. This solid analyzed as nitrogen 11.42% (Kjeldahl). The crude product was separated into a solid consisting mainly of pentaerythritol tetracyanoacetate and a fraction consisting of hydroxyl-containing esters.

Twenty-five grams of the crude product was extracted for 30 hours in a Soxhlet extractor with ethyl acetate. A light-colored white solid remained consisting of 48% of the crude material. Nitrogen 12.84%. Melting point 170° C. Soluble in acetone. This is mainly the tetracyanoacetate ester.

The ethyl acetate solution from the extraction was evaporated, leaving a light brown, thick liquid. Nitrogen 8.5%. Specific gravity 1.204 at 27° C. $n_D^{24}$ 1.462.

*Example 7.*—A mixture of 124 cc. ethyl cyanoacetate, 150 cc. xylene, 18 cc. glycerol, and 1.5 g. sodium methoxide (as alcoholysis catalyst) was heated under a reflux condenser for 3.5 hours at 110° C. The temperature was then gradually raised to 145° C. with the condenser turned down for distillation, during which time a distillate containing 34.2 cc. alcohol was collected. The upper xylene layer containing unreacted ethyl cyanoacetate was separated from the reaction mixture and the lower layer was washed with water containing a small amount of potassium carbonate. The water-insoluble residue was extracted with ethyl acetate and the ethyl acetate solution was dried with anhydrous sodium sulfate. Upon distillation of the solvent a glycerol cyanoacetate remained which was similar to the product of Example 3.

Cyanoacetic acid esters of polyhydric alcohols react with aldehydes to form resins, the resins obtained from formaldehyde and esters containing more than one cyanoacetyl group being heat-hardening. In my copending application Serial No. 528,162, filed March 25, 1944, I have described and claimed the heat-hardening resins made therefrom.

I claim:

1. An ester of cyanoacetic acid and a polyhydric alcohol $R(OH)n$, having the formula $(NC-CH_2COO)_x-R(OH_{n-x})$, where R is the hydrocarbon residue of said polyhydric alcohol, $n$ represents the number of hydroxyl groups in the polyhydric and $x$ is an integer from 1 to $n$.

2. An ester of cyanoacetic acid and glycerol.

3. An ester of cyanoacetic acid and ethylene glycol.

4. An ester of cyanoacetic acid and pentaerythritol.

5. Glycerol tricyanoacetate.

6. Glycol dicyanoacetate.

7. Pentaerythritol tetracyanoacetate.

8. The process of making a cyanoacetic acid ester of a polyhydric alcohol, which comprises heating a mixture of cyanoacetic acid and a polyhydric alcohol in the presence of a volatile hydrocarbon and a strong acid catalyst, whereby water is eliminated, and separating a cyanoacetic acid-polyhydric alcohol ester from the reaction mixture.

JOHN B. RUST.

REFERENCES CITED

The following references are of record in the file of this patent:

Karvonen, Chemical Abstracts, vol. 18, p. 1982 (1924).

Kailan et al., Chemical Abstracts, vol. 28, col. 7126 (1934).